W. TRUAX.
Spreaders for Double Harness.

No. 151,809. Patented June 9, 1874.

Witnesses.

Inventor:
Wm Truax.

UNITED STATES PATENT OFFICE.

WILLIAM TRUAX, OF WAYLAND, MICHIGAN.

IMPROVEMENT IN SPREADERS FOR DOUBLE HARNESS.

Specification forming part of Letters Patent No. 151,809, dated June 9, 1874; application filed February 2, 1874.

*To all whom it may concern:*

Be it known that I, WILLIAM TRUAX, of Wayland, county of Allegan, State of Michigan, have invented a Spreader for Double Harness, of which the following is a specification:

The object of my invention is the construction of a double snap-hook, (called a spreader,) arranged for the purpose of holding the cross-lines of a double harness when upon horses in such a manner that the horses may be spread any convenient distance apart when desired and the lines kept from twisting, the same to supersede or take the place of buckle-strap and ring, usually used for that purpose.

Figure 1:
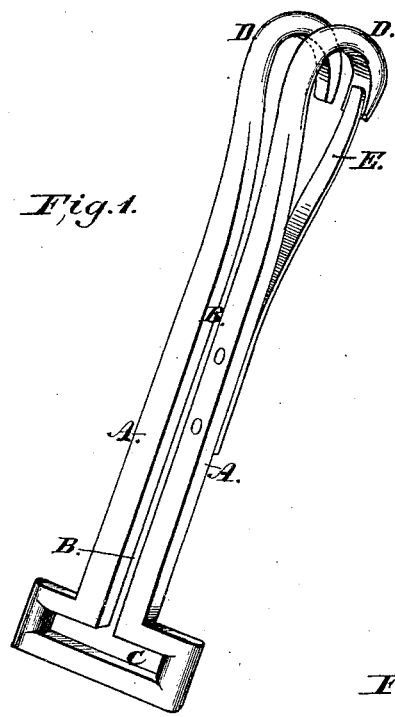
Figure 2:
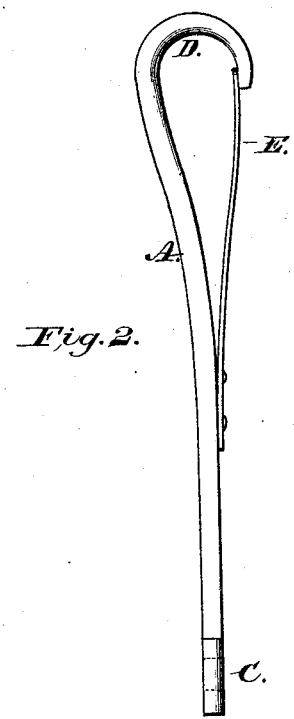

In the drawing, Figure 1 represents the entire spreader; A A, the wire of which it is made, bent in the proper form for the desired purpose, and terminating at the upper end with hooks D and snap E, Fig. 2. The two wires A A are apart a sufficient distance to admit the thickness of a flat cross-line making the space B, which terminates at the bottom of the hook in the horizontal space C.

To use this spreader, fasten the hooks D into a ring usually found on the hames of an ordinary harness. The cross-line is slipped through the space B and turned into the space C, where it remains in its natural position, the shape of the space C keeping the line from twisting, thus moving the line from the ring in the hames the distance of the length of the hook and allowing the horses to spread apart accordingly, the same as the ordinary buckle-strap and ring, but is more easily adjusted.

What I claim to have invented, and desire to secure by Letters Patent, is—

The above-described double snap-hook or spreader, with the spaces B and C, substantially as and for the purposes set forth.

WM. TRUAX.

Witnesses:
EDWIN A. BURLINGAME,
WILLARD KINGSLEY.